Aug. 11, 1942.  R. L. FARRIER  2,292,623
PHOTO-ELECTRIC EXPOSURE METER
Filed March 29, 1939
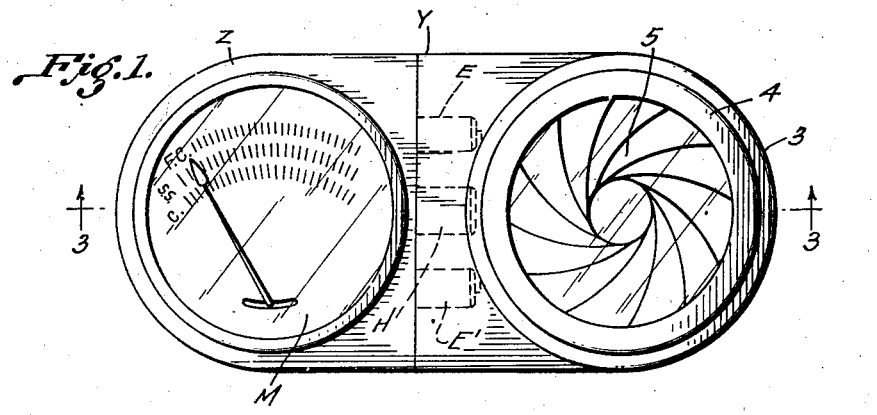
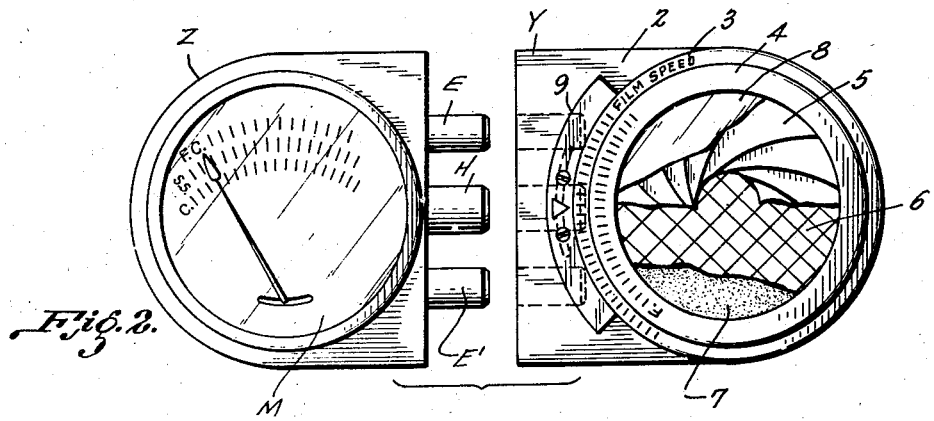
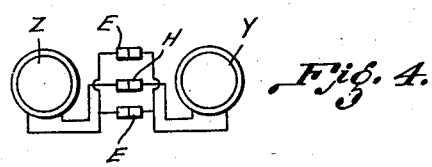
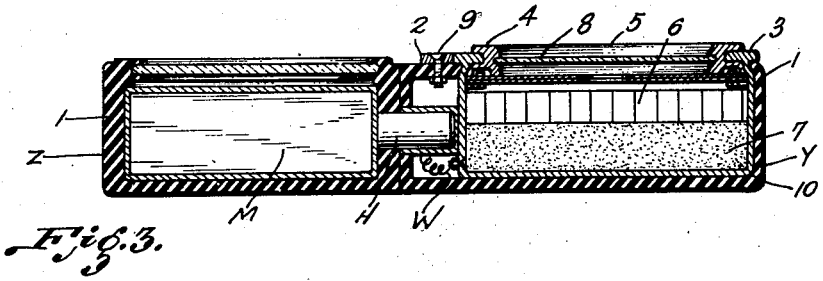
Inventor,
ROBERT L. FARRIER
By Everett A. Curtis
Atty.

Patented Aug. 11, 1942

2,292,623

UNITED STATES PATENT OFFICE 2,292,623

PHOTOELECTRIC EXPOSURE METER

Robert L. Farrier, Pacific Beach, Calif., assignor of one-half to Frederic Goodridge, La Mesa, Calif.

Application March 29, 1939, Serial No. 264,764

6 Claims. (Cl. 88—23)

My invention relates to photo-electric exposure meters, particularly those in which a photoelectric cell is used in connection with a meter sensitive thereto.

One important object of my invention is to construct a unit assembly in which the cell and meter may be separately and independently mounted so as to permit individual detachment and replacement in order that both may face in the same or in opposite directions.

Another object is to afford a diaphragm adjustment for the purpose of controlling the amount of light striking the face of the photoelectric cell, and permitting the employment of more sensitive and responsive elements than it has before been deemed practicable to use.

Another object is to provide a ready means for the correction and determination of the proper adjustment required for each of my improved meters at the time of manufacture or at any time subsequent thereto.

Other objects will appear from the drawing or as hereinafter described and claimed.

Through my separate and independent mounting of the photo-electric cell and the electric meter, I have provided a practicable means whereby anyone is enabled to use either cell or meter irrespective of the other where used for experimental work. If desired, these elements while continuing to maintain their operative relation may be turned and faced in opposite direction for use against the ground glass at the rear or back of a camera, or they can be used in the regulation way with the cell turned toward the subject to catch the light reflected therefrom and with the meter turned to face the operator. Such elements may also, when assembled to face in the same direction, be used to advantage by lighting engineers, or by photographers in conjunction with photographic enlargements.

In the adjustment of the diaphragm employed by me in the operation of my improved device, I prefer to arrange such adjustment so that the setting of such diaphragm will be identical with the setting of the diaphragm of the camera used, both being marked with the "F" system. This diaphragm adjustment will permit the use of a much larger or more sensitive photo-electric cell than is usually employed, and will also allow the use of a more sensitive electrical measuring instrument; thus permitting the use of my invention to be extended to lighting conditions in which heretofore it has been thought impossible to use ordinary commercial exposure meters, that is, where the light has been deemed too bright or too dim for effective work.

Attention is hereby directed to the accompanying drawing in which similar numerals of designation refer to similar parts throughout the several views, and in which—

Fig. 1 is a plan view of my improved device showing the two members containing the photoelectric cell and meter in assembled relation;

Figure 2 is a view similar to that of Figure 1, except that the two members are shown disassembled, and the cover glass and diaphragm are broken away to illustrate the position of the parts in respect to the body of the cell;

Figure 3 is a vertical longitudinal section on line 3—3 of Figure 1, looking in the direction of the arrows; and Figure 4 is the wiring diagram.

Referring to the drawing, the members Z and Y of my new assembly unit are each constructed with a casing 1 of Bakelite, synthetic resin or other non-magnetic material suitable for the purpose. Within the casing of member Z is installed a D'Arsonval or direct electrical current measuring instrument M, and in a rotatable box 10 within the casing of member Y are installed the photo-electric cell 7, grid 6, diaphragm 5 and other well-known operative parts. For a removable connection of the two members, I provide the member Z with the conductor fingers or plugs E, E' and H which engage with conductor sockets or receptacles shaped to receive the same in the adjacent casing of member Y, the central socket being electrically connected with the positive side of said cell 7, and the other sockets with the negative side thereof. If desired, however, these electrical connections may, as is obvious, be reversed so as to be opposite in sign.

The film speed ring 3 is mounted upon the upper edge of the cylindrical box 10, and serves as a manual means to rotate the same to a limited extent within the casing of member Y, the purpose of the said ring being to indicate through calibrations thereon the necessary corrections for inherent speeds of various film emulsions. The diaphragm ring 4 is constructed in the well-known manner to control the degree of opening of the aperture of the iris diaphragm 5 and thereby regulates the amount of light striking the upper surface of the cell 7.

The meter M in the member Z should be calibrated both in foot-candles and in shutter speed, and the said diaphragm ring 4 should be calibrated in the well-known "F" system in order to allow the reading of both exposure and aperture in direct terms from the meter. If desired, however, this arrangement of calibrations could readily be reversed so that the "F" system could be used in the meter and the ring 4 would read in shutter speed. A third calibration might also be employed for use with enlargements, both black and white, and for three color separation prints where the wash off relief method or other methods for the same purpose could be utilized. Also, this control of the light striking the upper surface of the said cell allows the use of a larger and more sensitive photo cell and a more sensitive meter than it has been possible to use heretofore, thereby greatly extending the scope and field of use of my improved device. So far as I am aware, prior to my invention, it has been impracticable to use indoors photo-electric meters because of their lack of sensitivity, the reason for such lack being that if these meters are made sufficiently sensitive to register indoor light, their capacity would be unsuited to the uncontrolled light of the out-of-doors. As will be observed, the grid 6 is of a simplified type. The movable indicator 2 is held in place by screws 9 adjustable in an arcuate slot formed in the casing of the member Y, which slot is shown in dotted lines in Fig. 2 and in section in Fig. 3 and is concentric with the cylindrical box 10 and the emulsion speed ring 3. If desired, the cover glass 8 may be of such shape and have such embellishments as would add to the appearance and salability of the device as an article of commercial manufacture.

By the word "support" as used in the claims I desire to be understood as meaning the combined casings of the members Z and Y, united as shown in the drawing, such casings constituting a basic structure upon which all parts are mounted or to which they are secured.

My invention may be embodied in other specific forms without departing from the spirit or essential characteristics thereof. The present embodiment, as above set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

What I claim and desire to secure by Letters Patent is:

1. In a photo-electric exposure meter, the combination of two separable casing members, an electrical measuring instrument installed in one of said members, a photo-electric cell installed within the other member, detachable conductor plugs and sockets therefor in said members and serving separably to connect the same, one of said plugs and socket therefor being arranged to be of one polarity, the other plugs and sockets therefor being arranged to be of opposite polarity; said first mentioned plug being arranged solely to engage with its own socket, and each of the other plugs being arranged so as to engage with its own and other sockets of the same polarity, and electrical connections maintaining said polarities and extending from said plugs and sockets respectively and connecting said meter and cell, whereby said casing members may readily be assembled to face either in the same or in opposite directions.

2. In a photo-electric exposure meter, the combination of two separable casing members, an electrical measuring instrument installed in one of said members, a photo-electric cell installed within the other member, detachable conductor plugs and sockets therefor in said members and serving separably to connect the same, one of said plugs and socket therefor being centrally located in respect to said members and being arranged to be of one constant polarity, the other plugs and sockets therefor being arranged to be of opposite polarity; said central plug being arranged solely to engage with its own socket, and each of the other plugs being arranged so as to engage with its own and other sockets of the same polarity, and electrical connections maintaining said polarities and extending from said plugs and sockets respectively and connecting said meter and cell, whereby said casing members may readily be assembled to face either in the same or in opposite directions.

3. In a photo-electric exposure meter, the combination of two separable casing members, an electrical measuring instrument installed in one of said members, a photo-electric cell installed within the other member, detachable conductor plugs secured to one of said members, and sockets therefor being provided in the other member, one of said plugs and sockets therefor being non-interchangeable with the others and being arranged to be constantly of one polarity and the other plugs and sockets being interchangeable one with the others, and arranged to be of opposite polarity, and electrical connections maintaining said polarities and extending from said plugs and sockets respectively and connecting said meter and cell, whereby said casing members may be readily assembled to face either in the same or in opposite directions.

4. In a photo-electric exposure meter, the combination of two separable casing members, an electrical measuring instrument installed in one of said members, a photo-electric cell installed within the other member, detachable conductor plugs secured to one of said members, and sockets therefor being provided in the other member, one of said plugs and socket therefor being centrally located and being non-interchangeable with the others and the other plugs and sockets being interchangeable one with the others, the said central plug and its socket being arranged to be of one polarity, and the other plugs and sockets being arranged to be of opposite polarity, and electrical connections maintaining said polarities and extending from said plugs and sockets respectively and connecting said meter and cell, whereby said casing members may be readily assembled to face either in the same or in opposite directions.

5. In a photo-electric exposure meter, the combination of two separable casing members, an electrical measuring instrument installed in one of said members, a photo-electric cell installed within the other member, three detachable conductor plugs secured to one of said members, and sockets therefor being provided in the other member, one of said plugs and socket therefor being centrally located and being non-interchangeable with the others and the other two plugs and sockets being interchangeable one with the others, the said central plug and its socket being arranged to be of one polarity, and the other two plugs and sockets being arranged to be of opposite polarity, and electrical connections maintaining said polarities and extending from said plugs and sockets respectively and connecting said meter and cell, whereby said casing members may be readily assembled to face either in the same or in opposite directions.

6. In a photo-electric exposure meter, the combination of two separable casing members, a direct current electrical measuring instrument installed in one of said members, a photo-electric cell rotatably mounted within the other member, detachable conductor plugs consisting of a central plug and plugs radially adjacent thereto secured to one of said members and sockets therefor provided in the other member, said central plug and socket therefor arranged to be constantly of one polarity, and the other plugs and sockets therefor arranged to be of the opposite polarity, and electric connections maintaining said polarities and operatively serving said instrument and cell, whereby said casing members may readily be assembled to face either in the same or in opposite directions, without reversing positive and negative contacts.

ROBERT L. FARRIER.